(12) United States Patent
Kamata

(10) Patent No.: US 9,965,711 B2
(45) Date of Patent: May 8, 2018

(54) IMAGE FORMING APPARATUS, AND IMAGE FORMING METHOD

(71) Applicant: Konica Minolta, Inc., Chiyoda-ku, Tokyo (JP)

(72) Inventor: Yoshihisa Kamata, Kanagawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/013,317

(22) Filed: Feb. 2, 2016

(65) Prior Publication Data
US 2016/0232436 A1    Aug. 11, 2016

(30) Foreign Application Priority Data

Feb. 9, 2015   (JP) ................................ 2015-023051

(51) Int. Cl.
*G03G 15/00*    (2006.01)
*G06K 15/00*    (2006.01)
*G06K 15/16*    (2006.01)

(52) U.S. Cl.
CPC ..... *G06K 15/4025* (2013.01); *G03G 15/5016* (2013.01); *G03G 15/6508* (2013.01); *G06K 15/16* (2013.01)

(58) Field of Classification Search
CPC .... G06F 3/1273; G06F 3/1204; G06F 3/1229; G03G 15/5016; G03G 15/6508; G06K 15/4025; G06K 15/16
See application file for complete search history.

(56) References Cited

U.S. PATENT DOCUMENTS 9,223,276 B2 * 12/2015 Anno ................... G03G 15/502
2002/0126197 A1 * 9/2002 Minowa ................... B41J 2/355
                                                             347/193

(Continued)

FOREIGN PATENT DOCUMENTS

JP    2007-334189 A    12/2007
JP    2008-62518 A      3/2008

(Continued)

OTHER PUBLICATIONS

Office Action (Notification of Reasons for Refusal) dated Dec. 14, 2016, by the Japanese Patent Office in corresponding Japanese Patent Application No. 2015-023051 and an English Translation of the Office Action. (7 pages).

(Continued)

*Primary Examiner* — David Banh
(74) *Attorney, Agent, or Firm* — Buchanan Ingersoll & Rooney PC

(57) ABSTRACT

Provided are: a transfer medium supply unit that supplies a transfer medium for image formation; a storage unit that records supply unit setting information regarding the transfer medium supply unit and transfer medium information regarding the transfer medium; and a control unit that controls the image forming apparatus, wherein the control unit allows setting, in the supply unit setting information, the transfer medium information of the transfer medium to be used in the transfer medium supply unit, records the supply unit setting information including the set transfer medium information in the storage unit, and when the set transfer medium information is changed in the supply unit setting information, sets history information of the transfer medium information in the supply unit setting information including the changed transfer medium information and records the history information in the storage unit.

9 Claims, 13 Drawing Sheets

(56) References Cited

U.S. PATENT DOCUMENTS

| | | | | |
|---|---|---|---|---|
| 2005/0030334 A1* | 2/2005 | Kai | .................... | G06K 15/021 |
| | | | | 347/19 |
| 2011/0135322 A1* | 6/2011 | Masuyama | ............ | B41J 11/485 |
| | | | | 399/16 |
| 2015/0015916 A1* | 1/2015 | Kikuchi | ............. | G06K 15/1848 |
| | | | | 358/3.24 |
| 2015/0043021 A1* | 2/2015 | Ikeda | ................. | H04N 1/32561 |
| | | | | 358/1.13 |
| 2016/0059545 A1* | 3/2016 | Watanabe | .................. | B41J 3/46 |
| | | | | 347/5 |

FOREIGN PATENT DOCUMENTS

| | | |
|---|---|---|
| JP | 2013-31967 A | 2/2013 |
| JP | 2013-052597 | 3/2013 |
| JP | 2015-019306 | 1/2015 |

OTHER PUBLICATIONS

The First Office Action issued in corresponding Chinese Patent Application No. 201610082676.9, dated Nov. 6, 2017, with English Translation (17 pages).

\* cited by examiner

IMAGE FORMING APPARATUS, AND IMAGE FORMING METHOD

CROSS-REFERENCE TO RELATED APPLICATIONS

The present application claims priority under 35 U.S.C. § 119 to Japanese Patent Application No. 2015-023051, filed Feb. 9, 2015. The contents of this application are incorporated herein by reference in their entirety.

BACKGROUND OF THE INVENTION

Field of the Invention

The present invention relates to an image forming apparatus and an image forming method for printing an image on a transfer medium.

Description of the Related Art

In an image forming apparatus, paper type information is registered in setting information of a paper feed tray that feeds paper, and an image is printed on paper of a predetermined paper type fed from the paper feed tray according to print conditions in the image formation.

Conventionally, when the paper type information is to be set in the setting information of the paper feed tray, frequently used paper type information is registered in advance as paper profiles. Upon the setting, the information is called from the paper profiles to facilitate setting the paper type information. However, a large number of paper profiles can be registered, and selecting a paper profile from similar paper profiles is not easy. There is a problem that the operation is cumbersome.

An image forming apparatus is proposed in Japanese Patent Laid-Open No. 2013-52597, in which information of used paper feed trays is stored in paper profiles, and the information of the used trays is displayed when the paper profiles are displayed. In this way, the association between the paper profiles and the used trays can be easily determined, and selection of the paper type information is facilitated.

However, in the method of Japanese Patent Laid-Open No. 2013-52597, the information of the paper feed tray does not remain in the paper profile when the paper type information in the setting information of the paper feed tray is manually changed after the information is called from the paper profile and reflected on the setting of the paper feed tray. Therefore, the paper profile needs to be set again to use the paper profile.

Furthermore, when a job with a different paper type is printed after an output job is suspended due to an interrupt or priority output, a change to the paper type information used in the job to be output again is necessary to restart the suspended job, and this is burdensome. The information needs to be registered again when the information is not set in the paper profile, and even if the information is registered, it takes time to find matching information from a large amount of information.

In a case without these circumstances, even if the association of the used trays is displayed in the list of the paper profiles when the paper type information is to be set in the setting information of the paper feed trays, operation of selecting a desired paper profile from a large number of paper profiles is still inconvenient and difficult.

The present invention has been made in view of the circumstances, and an object of the present invention is to provide an image forming apparatus and an image forming method that facilitate resetting paper type information in setting information of paper feed trays.

SUMMARY OF THE INVENTION

To achieve at least one of the abovementioned objects, an image forming-apparatus reflecting one aspect of the present invention includes:

a transfer medium supply unit that supplies a transfer medium for image formation;

a storage unit that records supply unit setting information regarding the transfer medium supply unit and transfer medium information regarding the transfer medium; and a control unit that controls the image forming apparatus, and the control unit allows setting, in the supply unit setting information, the transfer medium information of the transfer medium to be used in the transfer medium supply unit, records the supply unit setting information including the set transfer medium information in the storage unit, and when the set transfer medium information is changed in the supply unit setting information, sets history information of the transfer medium information in the supply unit setting information including the changed transfer medium information and records the history information in the storage unit.

In the image forming apparatus according to the abovementioned aspect, it is preferable that the control unit allows calling the history information stored in the storage unit to set the transfer medium information in the supply unit setting information.

In the image forming apparatus according to the abovementioned aspect, it is preferable that the control unit has a function of allowing to call and set the transfer medium information stored in the storage unit and a function of allowing to call and set the history information stored in the storage unit, in setting the transfer medium information in the supply unit setting information.

In the image forming apparatus according to the abovementioned aspect, it is preferable that the control unit records, in the transfer medium information, use records of the transfer medium supply unit used for the setting and presents used tray records of the transfer medium information in calling the transfer medium information.

In the image forming apparatus according to the abovementioned aspect, it is preferable that the image forming apparatus further includes a display operation unit for display and operation, and the control unit can register the history information in the transfer medium information through the operation unit.

In the image forming apparatus according to the abovementioned aspect, it is preferable that the image forming apparatus further includes a display operation unit for display and operation, and the control unit can display the history information on the display operation unit, and in displaying the history information, the control unit also displays one or both of information for identifying the transfer medium information of a call source and information indicating whether there is a change in the transfer medium information.

To achieve at least one of the abovementioned objects, an image forming method reflecting one aspect of the present invention includes:

a step of setting and recording, in supply unit setting information regarding a transfer medium supply unit that supplies a transfer medium for image formation, transfer medium information of the transfer medium to be used in the transfer medium supply unit; and when the transfer medium information in the supply unit setting information is changed, a step of setting and recording history information of the transfer medium information in the supply unit setting information including the changed transfer medium information.

In the image forming method according to the abovementioned aspect, it is preferable that the image forming method further includes a step of allowing to call the stored history information to set the transfer medium information in the supply unit setting information.

In the image forming method according to the abovementioned aspect, it is preferable that a step of calling and setting the stored transfer medium information and a step of calling and setting the stored history information can be selected in setting the transfer medium information in the supply unit setting information.

DETAILED DESCRIPTION OF THE PREFERRED EMBODIMENT

Figure 1:
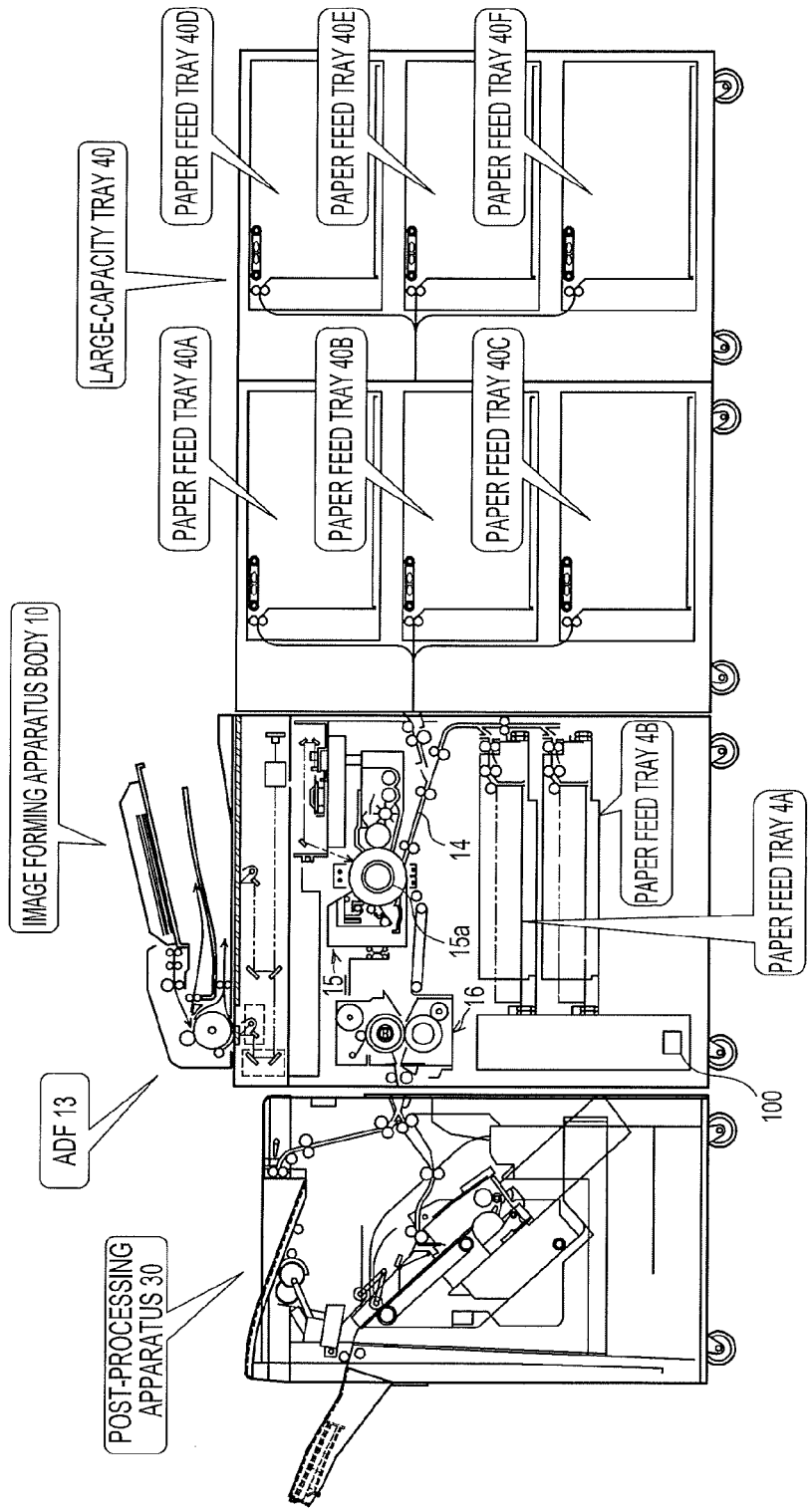
FIG. 1 is a diagram showing an image forming apparatus according to an embodiment of the present invention.

As shown in FIG. 1, an image forming apparatus 1 includes a large-capacity tray 40 connected to the upstream of an image forming apparatus body 10, and the large-capacity tray 40 includes a plurality of paper feed trays 40A to 40F. A post-processing apparatus 30 is connected to the downstream in a conveyance direction of the image forming apparatus body 10. A post-processing apparatus can be connected to the image forming apparatus 1, and the large-capacity tray 40 can be outside of the image forming apparatus 1.

The image forming apparatus body 10 includes an image forming unit 15, and the image forming unit 15 includes a photoreceptor 15a. A charger, a writing unit including an LD, and a developing unit are arranged on the circumference of the photoreceptor 15a. An image is exposed on the surface of the photoreceptor 15a charged by the charger based on image information of a document recorded in an image memory or the like, and a latent image is formed on the surface of the photoreceptor 15a. The developing unit develops the latent image to form a toner image. The toner image is transferred to paper conveyed by a conveyance path 14. A fixing device 16 heats and fixes the paper including the transferred toner image, and the paper is ejected to the post-processing apparatus 30. Paper feed trays 4A and 4B are provided on the lower side of the image forming apparatus body 10. Paper is stored in the paper feed trays 4A, 4B, and 40A to 40F. The paper feed trays 4A, 4B, and 40A to 40F are equivalent to a transfer medium supply unit of the present invention. The paper is equivalent to a transfer medium of the present invention. The transfer medium is not limited to the paper and is not limited to a sheet-like medium.

An ADF 13 (auto document feeder) that automatically feeds a document is installed on the upper side of the image forming apparatus body 10, and the document can be read.

Figure 2:
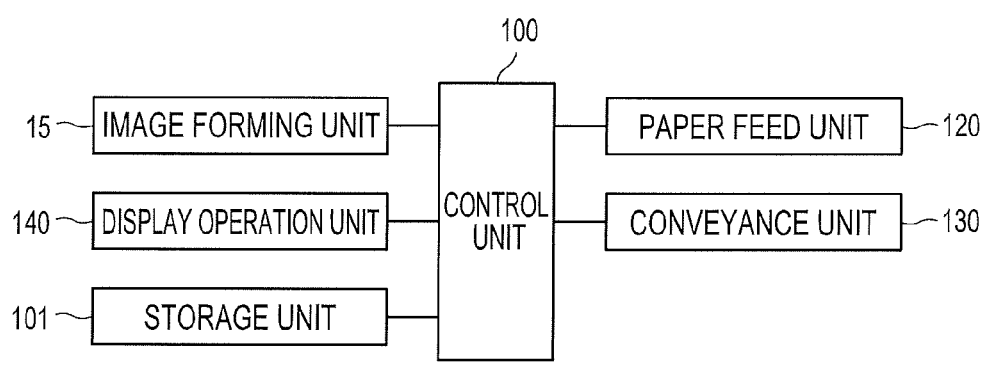
FIG. 2 is a diagram showing functional blocks according to the embodiment of the present invention.

FIG. 2 shows main functional blocks of the image forming apparatus 1.

A control unit 100 includes a CPU, a program for causing the CPU to execute predetermined operation, and the like. The control unit 100 controls the entire image forming apparatus 1.

The image forming unit 15 is connected to the control unit 100, and the control unit 100 can control the image forming unit 15. The control unit 100 controls image formation in the image forming unit 15.

A storage unit 101 is connected to the control unit 100, and the control unit 100 can control the storage unit 101. The storage unit 101 includes a RAM, a ROM, and the like, such as a non-volatile memory and an image memory. The storage unit 101 stores programs, image data, operation control parameters, paper feed tray setting information, paper information, and the like.

The control unit 100 can read the data of the storage unit 101, and the control unit 100 can write data in the non-volatile memory, the RAM, and the like. The paper feed tray setting information is equivalent to supply unit setting information of the present invention, and the paper information is equivalent to transfer medium information of the present invention.

A paper feed unit 120 is connected to the control unit 100, and the control unit 100 can control the paper feed unit 120. The paper feed unit 120 includes the paper feed trays 4A, 4B, and 40A to 40F, paper feed rollers for feeding paper from the paper feed trays, a paper feed drive motor, and the like.

A conveyance unit 130 is connected to the control unit 100, and the control unit 100 can control the conveyance unit 130. The conveyance unit 130 includes the conveyance path 14, a conveyance roller, a conveyance drive motor, and the like.

A display operation unit 140 is connected to the control unit 100, and the control unit 100 can control the display operation unit 140. The control unit 100 controls display of information and an operation screen on the display operation unit 140, reception of operation input by the display operation unit 140, and the like.

Figure 3:
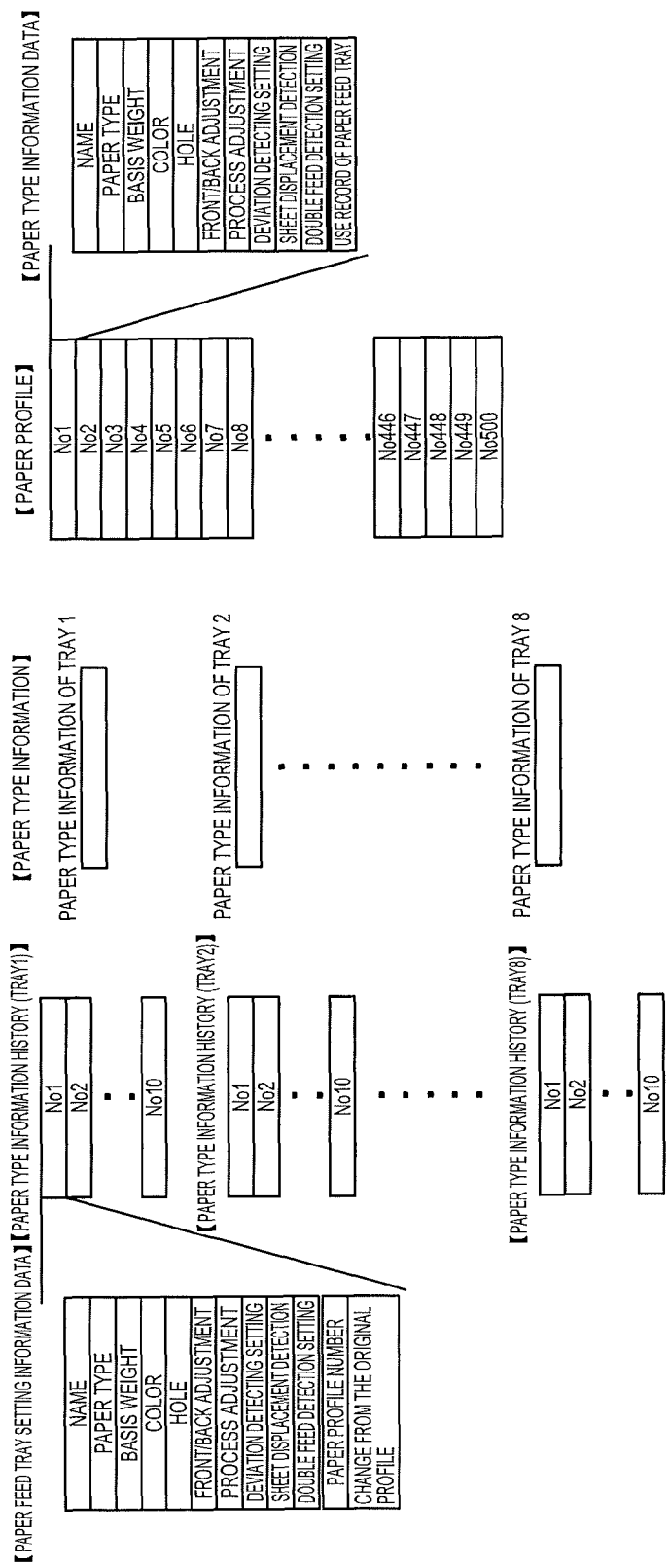
FIG. 3 is a diagram showing a data structure stored in a storage unit according to the embodiment of the present invention.

FIG. 3 shows a data structure of part of the setting information stored in the storage unit 101. Examples of the information shown here include paper feed tray setting information data, paper type information history information, paper feed tray setting paper type information, paper profiles, and paper type information data. Information of the paper profiles is recorded in the paper feed tray setting paper type information, and the paper type information data is recorded in association with the paper profiles. Use records of paper feed trays are stored in the paper type information data. As a result, the paper profiles and the use records of the paper feed trays are associated and recorded.

Various setting items are further recorded in the paper feed tray setting information data. Items of history information of used paper type, paper profile number, and information indicating whether there is a change in the paper type from the original profile are provided. The paper profile number is equivalent to information for identifying the transfer medium information.

In the present invention, the history information can be directly recorded in the paper feed tray setting information, or the paper feed tray setting information and the paper type information history can be associated and recorded as shown in FIG. 3.

Figure 4:
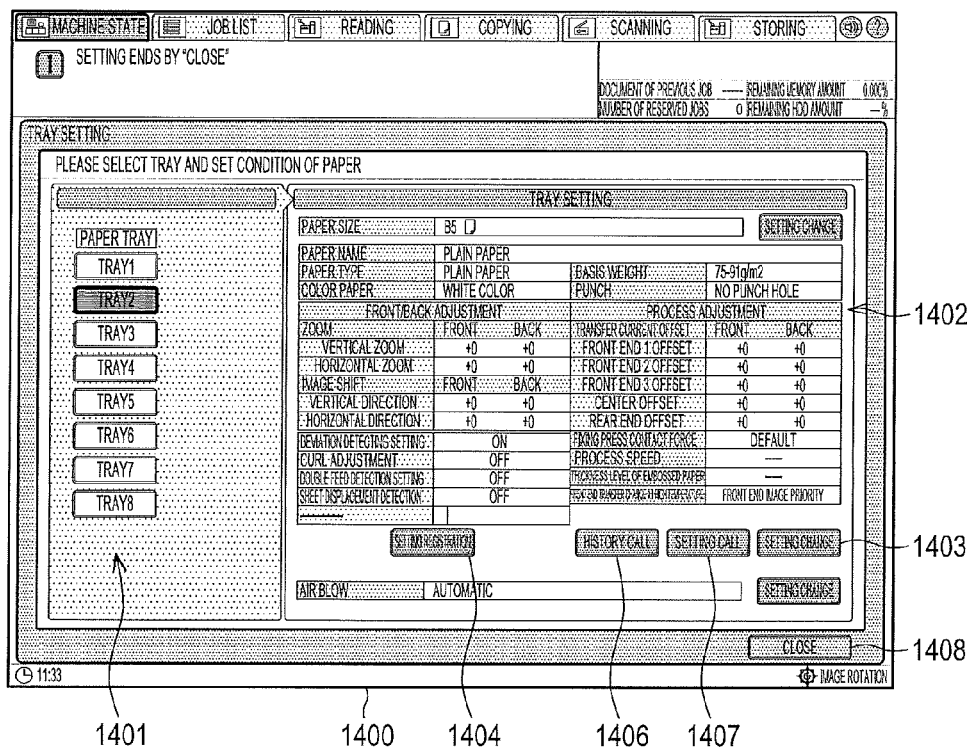
FIG. 4 is a diagram showing a paper feed tray setting screen according to the embodiment of the present invention.

FIG. 4 shows a tray setting screen 1400 displayed on the display operation unit 140.

A paper feed tray selection button group 1401 is provided on the left side of the screen, and a desired button of tray No. can be pressed to select a tray. The button of the selected tray is inverted and displayed. In this example, tray No. 2 is selected and inverted. After selection of a tray, setting content of tray corresponding to the tray is displayed in tray setting content 1402 in the main part on the right side of the screen. A setting change button 1403 can be pressed to change each item of the tray setting content 1402. After the change of the setting, a setting registration button 1404 is pressed to overwrite and register the setting content in the storage unit 101.

On the lower side of the screen of the tray setting content 1402, a history call button 1406 and a setting call button 1407 are displayed and can be pressed. The tray setting screen 1400 is closed when a close button 1408 is pressed.

Figure 5:
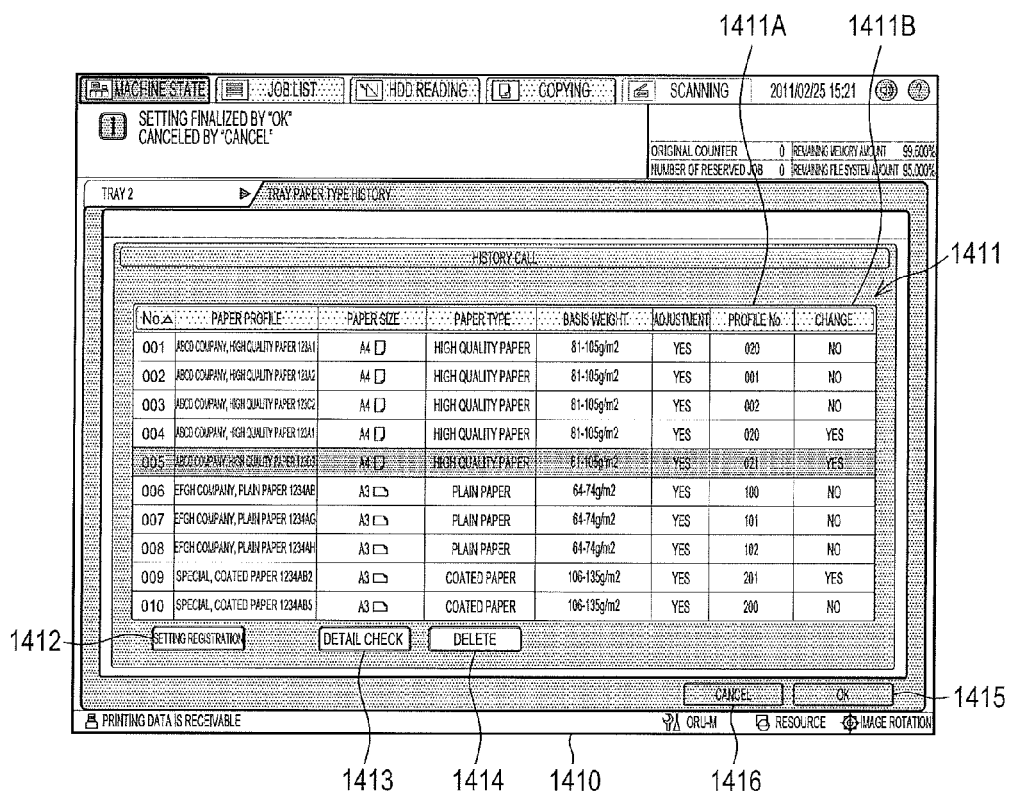
FIG. 5 is a diagram showing a tray paper type history screen after call of history information on the paper feed tray setting screen according to the embodiment of the present invention.

The screen is shifted when the history call button 1406 is pressed, and a tray paper type history screen 1410 shown in FIG. 5 is displayed.

On the tray paper type history screen 1410, a paper type information field 1411 according to histories is displayed in the order of histories. In the paper type information field 1411, paper profile name, paper size, paper type, basis weight, whether there is an adjustment, profile No, and whether there is a change in the paper type in the paper feed tray setting information are displayed for each history. One of the paper profiles can be selected in the paper type information field 1411. The selected paper profile is inverted and displayed. In this example, a paper profile of No. 005 is selected. The selected history information is registered in the paper profile when a setting registration button 1412 is pressed in the state that the paper profile is selected. This allows the user to register, in the paper profile, the paper type information that the user has forgotten to register.

In the state that the paper profile is selected, details of the paper profile are displayed on another screen when a detail check button 1413 is pressed, and the paper profile is deleted from the paper type history when a delete button 1414 is pressed.

The content of the paper type information can be set in the paper type information of the tray when an OK button 1415 is pressed in the state that the paper profile is selected, and the content of the paper profile is displayed in the tray setting content 1402. When a cancel button 1416 is pressed, the paper type information is not selected or changed, and the display returns to the tray setting screen 1400.

Figure 11:
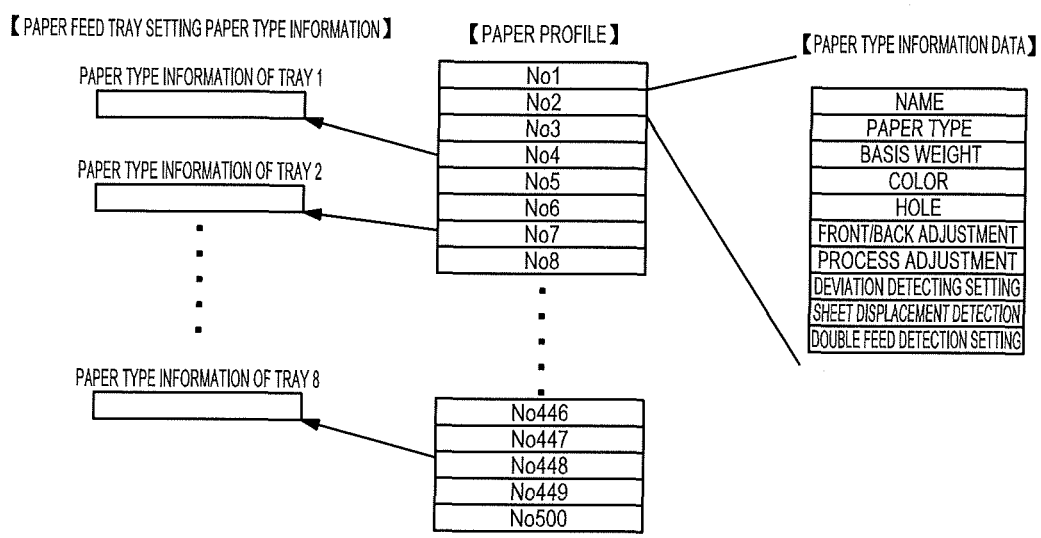
FIG. 11 is a diagram showing a conventional data configuration of paper feed tray setting information, paper profile information, and paper type information.

FIG. 11 is a diagram showing a data structure in a conventional technique.

The data structure includes paper feed tray setting paper type information, paper profiles, and paper type information data. The paper profiles are associated with the paper feed tray setting paper type information, and the paper type information data is associated with the paper profiles.

Figure 12:
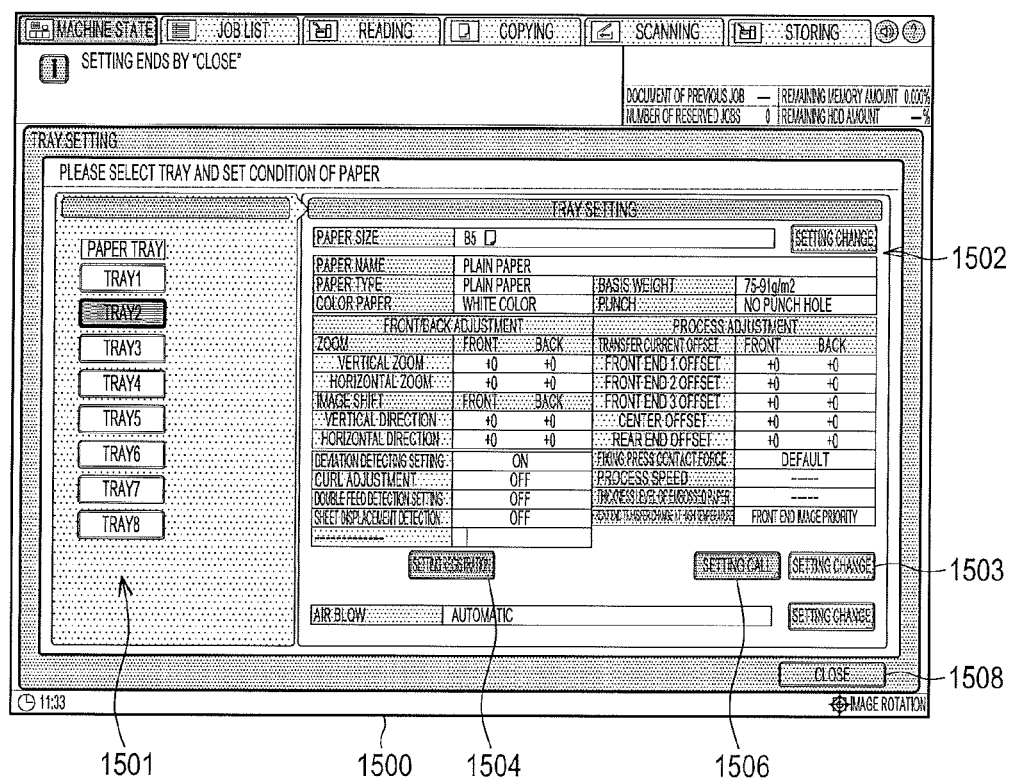
FIG. 12 is a diagram showing a conventional paper feed tray setting screen.

FIG. 12 shows a tray setting screen 1500 based on the data structure in the conventional technique.

A paper feed tray selection button group 1501 is provided on the left side of the screen, and a desired button of tray No. can be pressed to select a tray. The button of the selected tray is inverted and displayed. In this example, tray No. 2 is selected and inverted. After selection of a tray, setting content of the tray is displayed in tray setting content 1502 in the main part on the right side of the screen. A setting change button 1503 can be pressed to change each item of the tray setting content. After the change of the setting, a setting registration button 1504 is pressed to register the setting content.

On the lower side of the screen of the tray setting content 1502, a setting call button 1506 is displayed and can be pressed. The tray setting screen is closed when a close button 1508 is pressed.

Figure 13:
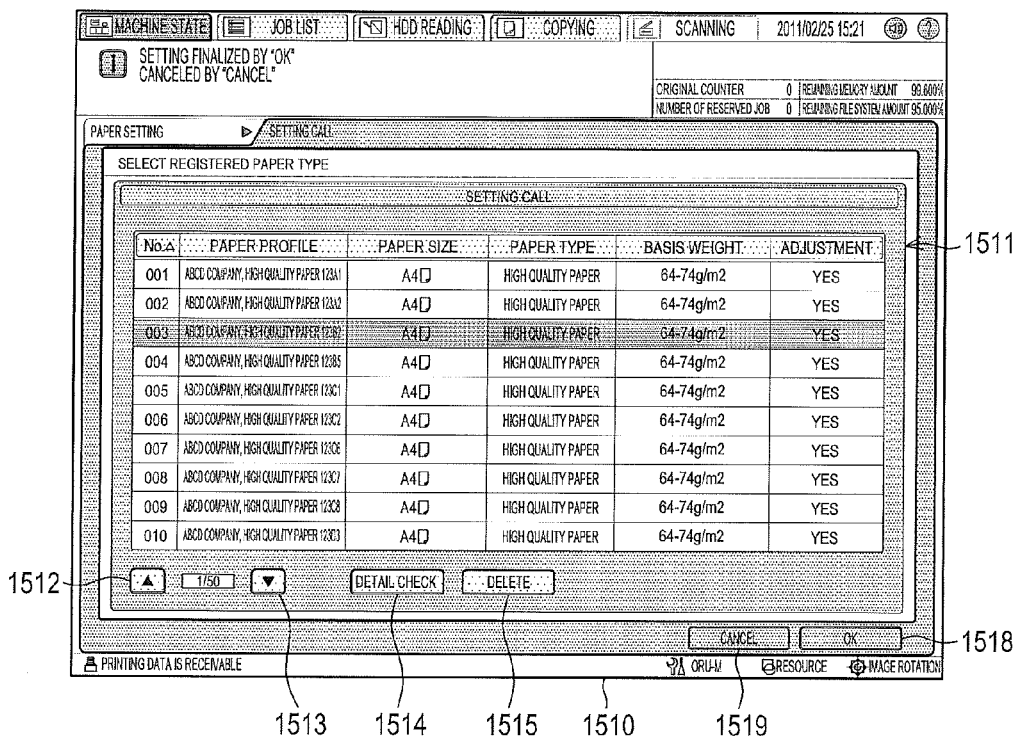
FIG. 13 is a diagram showing a conventional paper profile call screen called on the paper feed tray setting screen.

The screen is shifted when the setting call button 1506 is pressed, and paper profile call screen 1510 is displayed as shown in FIG. 13.

A paper profile list 1511 is displayed on the paper profile call screen 1510. In the paper profile list 1511, paper profile name, paper size, paper type, basis weight, and whether there is an adjustment are displayed. One of the paper profiles can be selected in the paper profile list 1511. The selected paper profile is inverted and displayed. In this example, a paper profile of No. 003 is selected. The selected position can be changed by an up key 1512 and a down key 1513.

In the state that the paper profile is selected, details of the paper profile are displayed on another screen when a detail check button 1514 is pressed, and the paper profile is deleted from the paper type history when a delete button 1515 is pressed.

The paper profile can be set in the paper type information of the tray when an OK button 1518 is pressed in the state that the paper profile is selected, and the content of the paper profile is displayed in the tray setting content 1502. When a cancel button 1519 is pressed, the paper profile is not selected or changed, and the display returns to the tray setting screen 1500.

Figure 6:
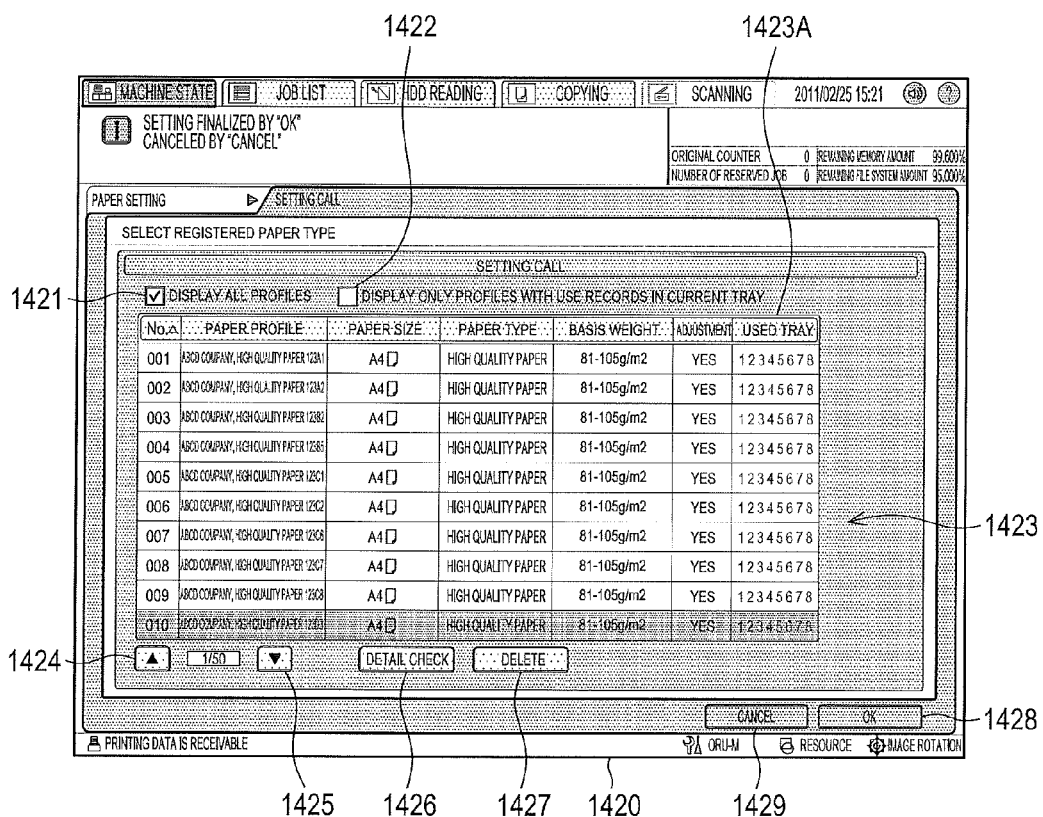
FIG. 6 is a diagram showing a paper profile call screen regarding all paper profiles called on the paper feed tray setting screen according to the embodiment of the present invention.
Figure 7:
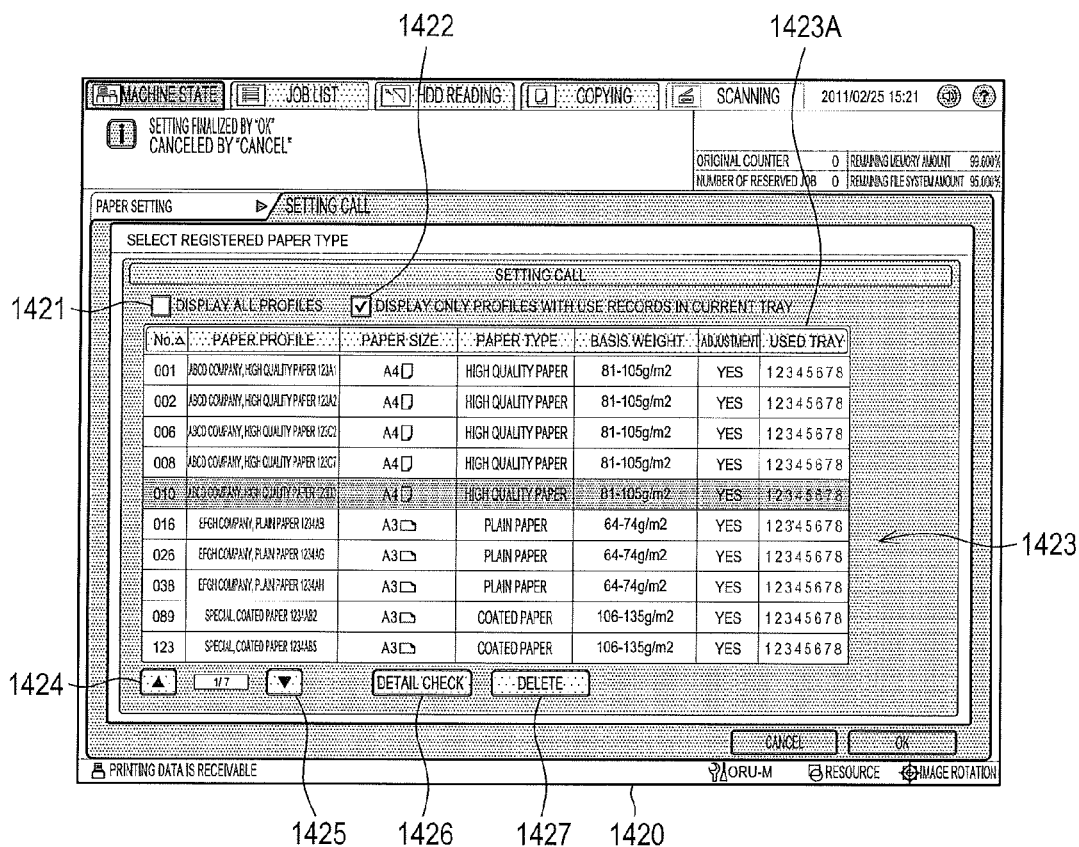
FIG. 7 is a diagram showing a paper profile call screen related to use histories of a specific tray called on the paper feed tray setting screen according to the embodiment of the present invention.

FIGS. 6 and 7 show a paper profile call screen 1420 displayed after a shift of the screen when the setting call button 1407 is pressed on the tray setting screen 1400.

The paper profile call screen 1420 includes a "display all profiles" check field 1421 and a "display only profiles with use records in current tray" check field 1422, and only one of the fields can be checked. All paper profiles are displayed in a paper profile list 1423 when the "display all profiles" check field 1421 is checked, and only the profiles with use records in the current tray are displayed in the paper profile list 1423 when the "display only profiles with use records in current tray" check field 1422 is checked.

In FIG. 6, the "display all profiles" check field 1421 is checked, and the paper profile call screen 1420 including all paper profiles displayed in the paper profile list 1423 is displayed. In FIG. 7, the "display only profiles with use records in current tray" check field 1422 is checked, and only profiles with use records in the current tray are displayed in the paper profile list 1423.

Paper profile names, paper sizes, paper types, basis weights, whether there is an adjustment, and used tray histories 1423A are displayed in the paper profile list 1423 displayed on the paper profile call screen 1420 of FIGS. 6 and 7. In the used tray histories 1423A, the used tray number is displayed in bold letters for each paper profile on the paper profile call screen 1420 of FIG. 6. One used tray number (tray No. 2 in this example) is displayed in bold letters on the paper profile call screen 1420 of FIG. 7.

One of the paper profiles can be selected in the paper profile list 1423. The selected paper profile is inverted and displayed. A paper profile of No. 10 is selected in this example. In the state that the paper profile is selected, details of the paper profile are displayed on another screen when a detail check button 1426 is pressed, and the paper profile is deleted from the paper type history when the delete button 1427 is pressed.

In the state that the paper profile is selected, the paper profile can be set in the paper type information of the tray when an OK button 1428 is pressed, and the content of the paper profile is displayed in the tray setting content 1402. When a cancel button 1429 is pressed, the paper profile is not selected or changed, and the display returns to the tray setting screen 1400.

Figure 8:
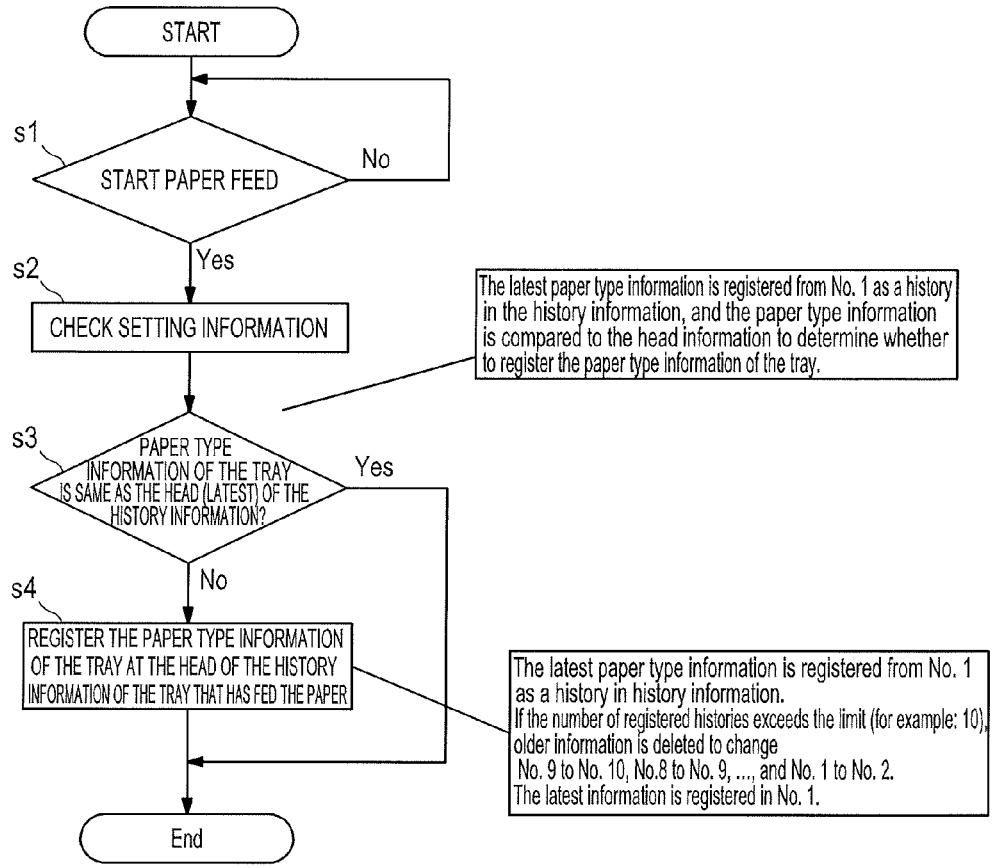
FIG. 8 is a flow chart showing a procedure of registering a history of tray paper type information according to the embodiment of the present invention.

A registration procedure of the paper type information history of the tray setting information will be described based on a flow chart of FIG. 8. The control unit controls and executes the following procedure.

The control unit waits for the start of paper feed (step s1). If the paper feed is started (step s1, Yes), the control unit checks the setting information of the paper feed tray (step s2). The control unit determines whether the paper type information of the paper feed tray is the same as the head (latest) of the history information (step s3). The latest paper type information is registered from No. 1 as a history in the history information, and the paper type information is compared to the head information to determine whether to register the paper type information of the tray. If the paper type information is the same as the head (latest) of the history information (step s3, Yes), the control unit ends the process.

If the paper type information is not the same as the head (latest) of the history information (step s3, No), the control unit registers the paper type information of the tray at the head of the history information of the tray that has fed the paper. The latest paper type information is registered from No. 1 as a history in the history information. If the number of registered histories exceeds the limit (for example: 10), older information is deleted to change No. 9 to No. 10, No. 8 to No. 9, . . . and No. 1 to No. 2. The latest information is registered in No. 1.

Figure 9:
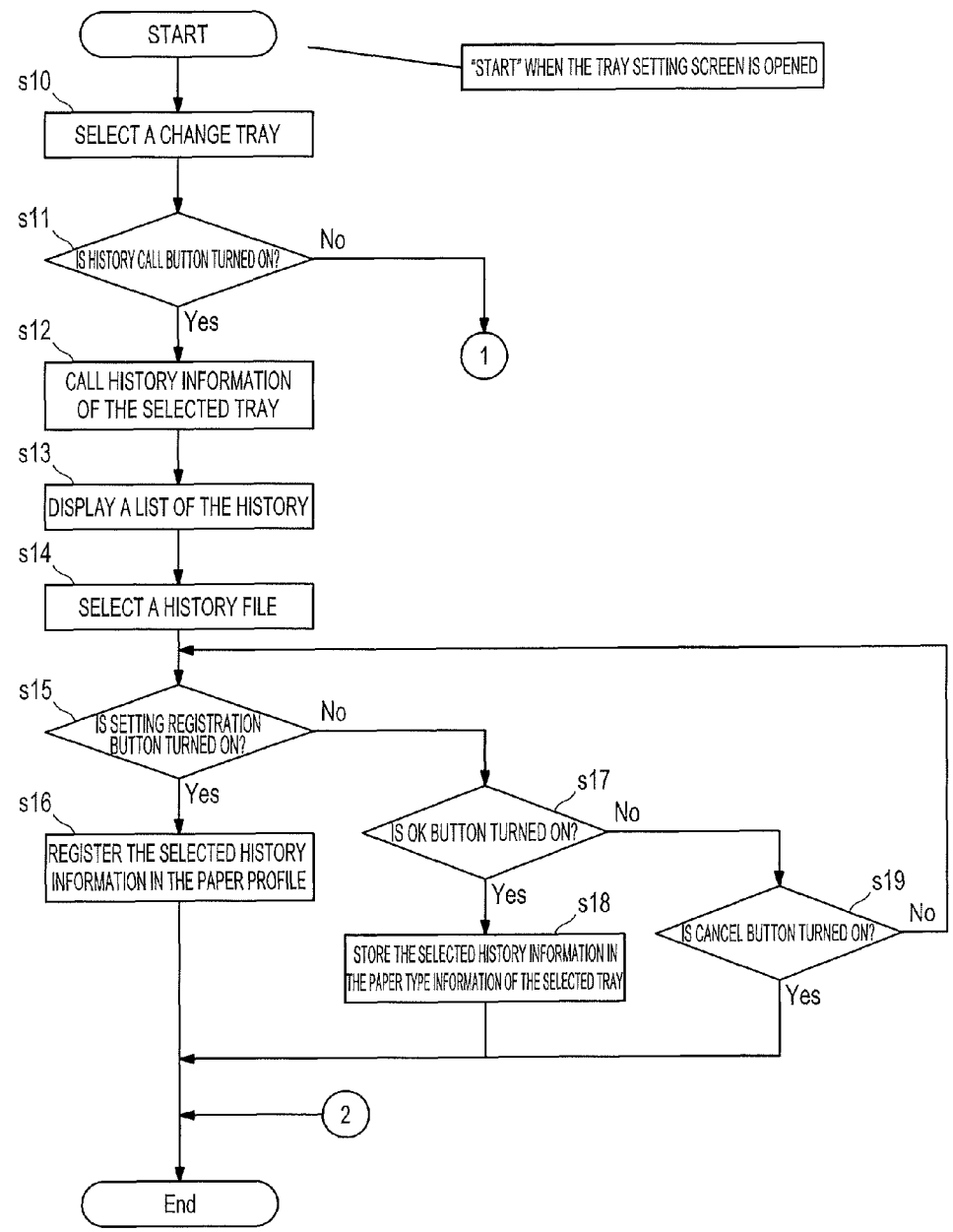
FIG. 9 is a flow chart showing a control procedure regarding paper type information of tray setting information according to the embodiment of the present invention.

A procedure of paper type information control in the setting information of the paper feed tray will be described based on a flow chart of FIG. 9. The control unit controls and executes the following procedure.

The control unit starts the procedure when the tray setting screen is opened. When a change tray is selected (step s10), the control unit determines whether a history read (call) button is turned on (step s11). If the button is not turned on (step s11, No), the control unit determines that setting call is turned on and proceeds to a procedure of No. 1 in a flow chart of FIG. 10 (step s20).

If the history read (call) button is turned on (step s11, Yes), the control unit calls the history information of the selected tray (step s12). After the call, the control unit displays a list of the history information on the operation display unit 140 (step s13) to allow selection of a history file and receives an operation input (step s14). After the reception of the operation input, the control unit determines whether the setting registration button is turned on (step s15). If the setting registration button is turned on (step s15, Yes), the control unit registers the selected history information in the paper profile (step s16) and ends the procedure.

If the setting registration button is not turned on (step s15, No), the control unit determines whether the OK button is turned on (step s17). If the OK button is turned on (step s17, Yes), the control unit stores the selected history information in the paper type information of the selected tray (step s18) and ends the procedure.

If the OK button is not turned on (step s17, No), the control unit determines whether the cancel button is turned on (step s19). If the cancel button is turned on (step s19, Yes), the control unit ends the procedure. If the cancel button is not turned on (step s19, No), the control unit returns to step s15 and repeats the determination of whether the setting registration button is turned on.

Figure 10:
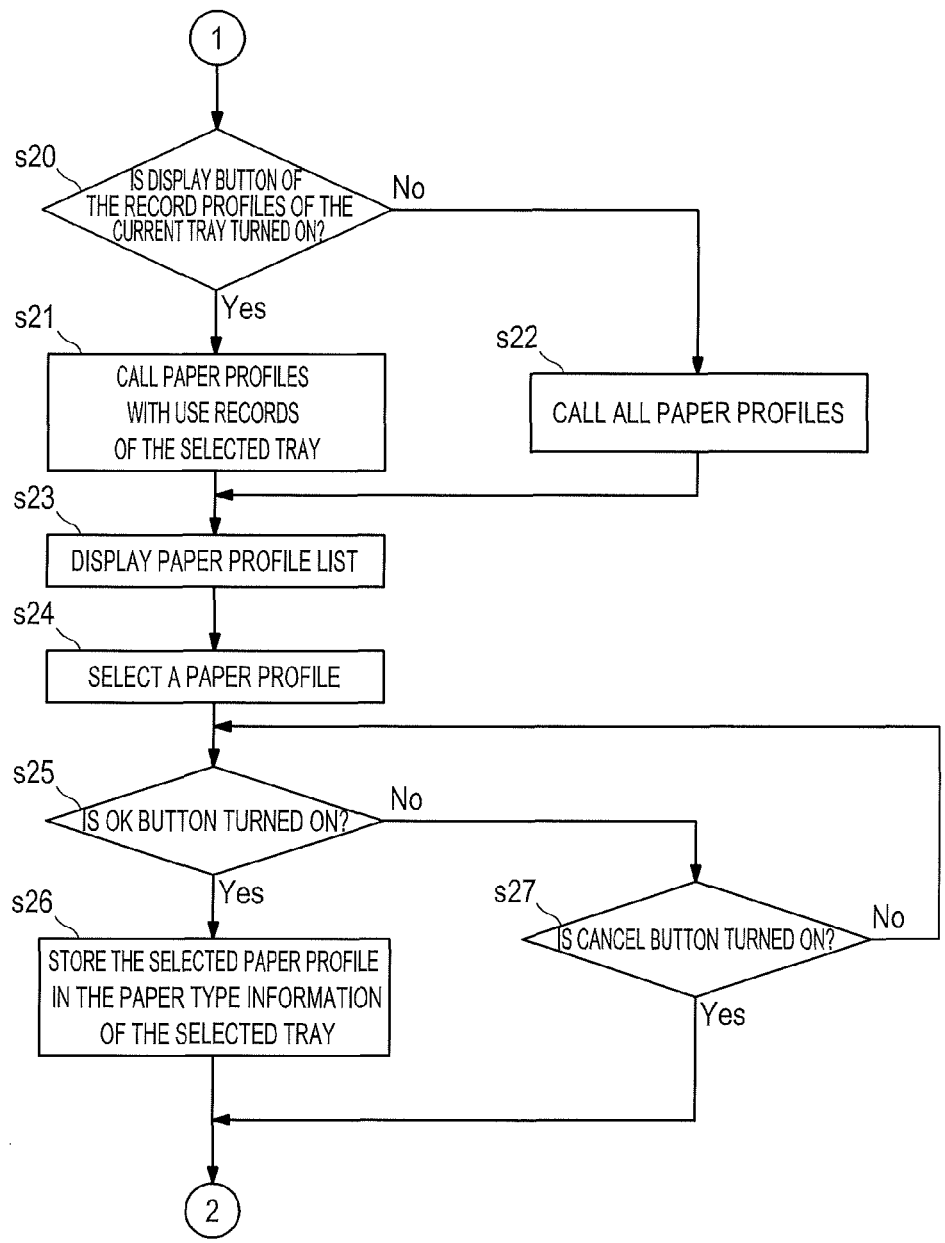
FIG. 10 is a flow chart showing a control procedure regarding paper profile call of the tray setting information according to the embodiment of the present invention.

A procedure when the setting call is turned on will be described based on the flow chart of FIG. 10. The control unit controls and executes the following procedure.

The control unit determines whether the display button (check) of the record profiles of the current tray is turned on (step s20). If the display button is turned on (step s20, Yes), the control unit calls the paper profiles with use records of the selected tray (step s21). If the display button is not turned on, the control unit determines that the display buttons of all paper profiles are turned on and calls all paper profiles (step s22).

After step s21 or step s22, the control unit displays the paper profile list on the operation display unit 140 (step s23). The operator selects a paper profile (step s24), and the control unit determines whether the OK button is turned on (step s25). If the OK button is turned on (step s25, Yes), the control unit stores the selected paper profile in the paper type information of the selected tray (step s26) and moves to the procedure of No. 2 in FIG. 9. If the OK button is not turned on (step s25, No), the control unit determines whether the cancel button is turned on (step s27). If the cancel button is turned on (step s27, Yes), the control unit moves to the procedure of No. 2 in FIG. 9. If the cancel button is not turned on (step s27, No), the control unit returns to step s25 and repeats the determination of whether the OK button is turned on.

According to the present embodiment, the paper type information can be easily reset in the setting information of the paper feed tray.

Although the present invention has been described based on the embodiment, the present embodiment can be appropriately changed without departing from the scope of the present invention.

What is claimed is:

1. An image forming apparatus comprising:
a transfer medium supply unit that supplies a transfer medium for image formation;
a storage unit that records supply unit setting information regarding the transfer medium supply unit, and that records transfer medium information regarding the transfer medium; and
a control unit that controls the image forming apparatus, wherein
the control unit is configured to:
set, in the supply unit setting information, the transfer medium information of the transfer medium to be used in the transfer medium supply unit,
record the supply unit setting information, including the set transfer medium information, in the storage unit, and
set history information of the transfer medium information in the supply unit setting information only when the set transfer medium information is changed in the supply unit setting information, the history information including the changed transfer medium information, and record the history information in the storage unit.

2. The image forming apparatus according to claim 1, wherein
the control unit is configured to obtain the history information stored in the storage unit to set the transfer medium information in the supply unit setting information.

3. The image forming apparatus according to claim 1, wherein
the control unit is configured to obtain and set the transfer medium information stored in the storage unit, and to obtain and set the history information stored in the storage unit, in order to set the transfer medium information in the supply unit setting information.

4. The image forming apparatus according to claim 3, wherein
the control unit records, in the transfer medium information, use records of the transfer medium supply unit used for the setting, and presents used tray records of the transfer medium information in obtaining the transfer medium information.

5. The image forming apparatus according to claim 1, further comprising
a display operation unit for display and operation, wherein
the control unit can register the history information in the transfer medium information via the operation unit.

6. The image forming apparatus according to claim 1, further comprising
a display operation unit for display and operation, wherein
the control unit is configured to display the history information on the display operation unit, and in displaying the history information, the control unit also displays one or both of information for identifying the transfer medium information of a call source and information indicating whether there is a change in the transfer medium information.

7. An image forming method comprising:
a step of setting and recording, in supply unit setting information regarding a transfer medium supply unit that supplies a transfer medium for image formation, transfer medium information of the transfer medium to be used in the transfer medium supply unit; and
a step of setting and recording history information of the transfer medium information in the supply unit setting information only when the transfer medium information in the supply unit setting information is changed, the history information including the changed transfer medium information.

8. The image forming method according to claim 7, further comprising
a step of allowing to obtain the stored history information to set the transfer medium information in the supply unit setting information.

9. The image forming method according to claim 7, wherein
a step of obtaining and setting the stored transfer medium information, and a step of obtaining and setting the stored history information, are executed in setting the transfer medium information in the supply unit setting information.

* * * * *